(12) United States Patent
Takita et al.

(10) Patent No.: US 7,360,000 B2
(45) Date of Patent: Apr. 15, 2008

(54) INFORMATION TRANSMITTING/RECEIVING SYSTEM, INFORMATION TRANSMITTING APPARATUS, INFORMATION RECEIVING APPARATUS, AND INFORMATION TRANSMITTING/RECEIVING METHOD

(75) Inventors: Taro Takita, Tokyo (JP); Satoru Maeda, Kanagawa (JP); Katsutoshi Sakao, Kanagawa (JP); Mariko Nakada, Saitama (JP)

(73) Assignee: Sony Corporation, Tokyo (JP)

( * ) Notice: Subject to any disclaimer, the term of this patent is extended or adjusted under 35 U.S.C. 154(b) by 617 days.

(21) Appl. No.: 11/038,185

(22) Filed: Jan. 21, 2005

(65) Prior Publication Data

US 2005/0210238 A1 Sep. 22, 2005

(30) Foreign Application Priority Data

Jan. 20, 2004 (JP) ............................ P2004-011978

(51) Int. Cl.
*G06F 13/12* (2006.01)
*G06F 13/38* (2006.01)

(52) U.S. Cl. .............................. 710/72; 710/62; 726/2; 725/135; 725/143

(58) Field of Classification Search ...................... None
See application file for complete search history.

(56) References Cited

U.S. PATENT DOCUMENTS

| 5,852,610 | A | 12/1998 | Olaniyan |
| 6,263,503 | B1 | 7/2001 | Margulis |
| 7,058,356 | B2 * | 6/2006 | Slotznick ................... 455/3.05 |
| 2001/0021998 | A1 * | 9/2001 | Margulis ..................... 725/81 |
| 2002/0061748 | A1 | 5/2002 | Nakakita et al. |

FOREIGN PATENT DOCUMENTS

| EP | 1 133 120 A2 | 9/2001 |
| EP | 1 182 825 A2 | 2/2002 |
| JP | 11-45508 | 2/1999 |
| JP | 2001-256156 | 9/2001 |
| JP | 2002-354556 | 12/2002 |
| JP | 2002-354557 | 12/2002 |
| JP | 2003-179773 | 6/2003 |
| JP | 2003-319471 | 11/2003 |
| WO | WO 00/51293 | 8/2000 |

OTHER PUBLICATIONS

Fukuhara Satoshi, et al., "Found out by trying! Try & Review, Domestic machine with a camera, LivingGate i", Linux WORLD, vol. 1, Issue 10, Oct. 1, 2002, pp. 46-53.
Igarashi Kenpei, et al., "Basic and application of IP packet filtering, Basic of security measure and how to use a low-end router, Chapter7", Open Design, vol. 8, Issue: 6, Jun. 1, 2001, pp. 55-63.

* cited by examiner

*Primary Examiner*—Alan S. Chen
(74) *Attorney, Agent, or Firm*—Oblon, Spivak, McClelland, Maier & Neustadt, P.C.

(57) ABSTRACT

An information transmitting/receiving system is disclosed which includes a base station apparatus and a monitor apparatus, the system being arranged to let the base station apparatus offer more content information to the monitor apparatus than before. On receiving a content transmission request, the base station apparatus performs an authenticating process using monitor apparatus registration information in order to send content information only to the registered monitor apparatus authorized to receive the content information. The monitor apparatus may register with a plurality of units of the base station apparatus. When the monitor apparatus selects any one of the multiple units of the base station apparatus to request transmission of content information therefrom, the selected base station unit transmits the requested content information to the requesting monitor apparatus.

20 Claims, 7 Drawing Sheets

FIG. 4

| NO. | MONITOR APPARATUS IDS |
|---|---|
| 1 | |
| 2 | |
| 3 | |
| 4 | |

BASE STATION APPARATUS
REGISTRATION TABLE

FIG. 5

| NO. | BASE STATION APPARATUS IDS |
|---|---|
| 1 | |
| 2 | |
| 3 | |
| 4 | |

REGISTERED STATUS TABLE
OF MONITOR APPARATUS

INFORMATION TRANSMITTING/RECEIVING SYSTEM, INFORMATION TRANSMITTING APPARATUS, INFORMATION RECEIVING APPARATUS, AND INFORMATION TRANSMITTING/RECEIVING METHOD

BACKGROUND OF THE INVENTION

The present invention relates to an information transmitting/receiving system for transmitting and receiving content information such as audio/video information over a network, to an information transmitting apparatus and an information receiving apparatus which make up the information transmitting/receiving system, and to an information transmitting/receiving method corresponding to the information transmitting/receiving system.

Applicant has proposed an information transmitting/receiving system designed to connect a base station apparatus with a monitor apparatus wirelessly, the system functioning typically as AV (audio video) equipment (see Japanese Patent Laid-open No. Hei 8-79847).

The base station apparatus of this information transmitting/receiving system may illustratively include a TV broadcast tuner capable of selecting TV broadcast signals and demodulating or decoding the received signal into audio/video signals. When equipped with audio/video input terminals, the base station apparatus may also input externally supplied video/audio sources through the terminals. The video/audio information thus acquired may be converted by the base station apparatus into compression-encoded audio/video data which in turn may be output wirelessly.

The monitor apparatus is illustratively a device small enough to be carried around in the room. In operation, the monitor apparatus receives the video/audio data transmitted wirelessly from the base station apparatus and decodes the received data into images and sounds to be output.

With the above information transmitting/receiving system in use, the user may illustratively carry around the monitor apparatus indoors and set it up where desired. Within a communicable range of the base station apparatus, the monitor apparatus may be located wherever desired to let the user view and enjoy TV broadcasts and content information such as video/audio information that has been input to the base station apparatus.

It is the monitor apparatus that operates the controls of the base station apparatus, such as those for tuning in to TV broadcasts and selecting audio/video sources. The information reflecting the operations is transmitted to the base station apparatus. On receiving the operation information, the base station apparatus carries out the corresponding controls causing illustratively the tuner to switch channels and changing input audio/video sources.

The information transmitting/receiving system outlined above may be considered a system having two kinds of equipment installed separately: equipment typically for inputting and acquiring audio/video sources (i.e., base station apparatus), and the monitor apparatus for outputting the audio/video input. When audio/video data is transmitted wirelessly from the base station to the monitor apparatus, the user is given a certain degree of freedom in selecting the location to view and enjoy the content information within a relatively limited range such as inside the house.

Where the above information transmitting/receiving system is established, the base station apparatus and the monitor apparatus may both be provided with the ability to connect with a network such as the Internet or a LAN (local area network). The connection allows the base station apparatus and monitor apparatus to exchange audio/video data and other content information over the Internet.

Given the capability to communicate over the Internet, the monitor apparatus is no longer subject to constraints on where to set up the connection as long as access to the Internet is ensured. In that case, the information transmitting/receiving system may be used in the following application:

The base station apparatus is established in a place remote from where the user utilizes the monitor apparatus. For example, the base station apparatus is installed in a service area far away from the service area of TV broadcasts covering the region where the monitor apparatus is to be used. The base station apparatus and monitor apparatus are then arranged to exchange not only audio/video data but also commands.

In that setup, the user is able to control the base station apparatus via the Internet so that the audio/video data of a selected TV broadcast received and demodulated by the base station apparatus may be sent to the monitor apparatus for audio/video output. In other words, a TV broadcast from a different area which is ordinarily not receivable in the area where the user is operating the monitor apparatus can be viewed through the Internet connection by the user remaining in that area.

Described below with reference to FIG. 8 is a procedure performed by the base station apparatus and the monitor apparatus to exchange audio/video data therebetween over the Internet. Steps constituting the procedure are indicated in FIG. 8 together with encircled numerals representative of the sequence in which they are to be carried out.

The information transmitting/receiving system made up of a base station apparatus 1 and a monitor apparatus 2 shown in FIG. 8 maintains a one-to-one correspondence between the two components. That is, one base station apparatus is made to correspond with one monitor apparatus within the system. To establish the one-to-one correspondence over the Internet requires first registering the user's monitor apparatus 2 with the base station apparatus 1 in step 1. This step, when carried out, causes the base station apparatus 1 to handle the registered monitor apparatus 2 alone as a legitimate apparatus to which to send audio/video data.

After the registration in step 1, the user may illustratively operate the monitor apparatus 2 to view a TV broadcast. In that case, the monitoring apparatus 2 in step 2 sends a transmission request command to the base station apparatus 1 over the Internet, the command being arranged to request the base station to transmit the audio/video data making up the selected TV broadcast to the monitor apparatus 2.

The base station apparatus 1 inputs TV broadcast waves received by an antenna, not shown, and causes an internal tuner to demodulate the received signals to acquire audio/video information from the outside. Upon receipt of the transmission request command in step 3, the base station apparatus 1 performs an authentication process, i.e., the apparatus 1 determines whether or not the monitor apparatus 2 having sent the command is an apparatus duly authorized to receive audio/video data. The authentication process involves determining whether or not the monitor apparatus 2 having sent the command is a registered monitor apparatus. More specifically, the ID of the monitor apparatus having transmitted the command is checked against the IDs of the registered monitor apparatuses for a match, the IDs constituting registration information.

When the monitor apparatus is found to be a legitimate monitor apparatus authorized to receive audio/video data as a result of the authentication process in step 3, the base station apparatus 1 in step 4 outputs the requested audio/video data on a streaming basis. Illustratively, the command requesting the transmission of audio/video data may designate a TV broadcast channel. In such a case, the base station apparatus 1 receives and demodulates the selected TV channel signal so as to acquire audio/video signals, encodes the acquired signals into compressed audio/video data, and transmits the compressed audio/video data in streaming fashion to the monitor apparatus 2 over the Internet.

In step 5, the monitor apparatus 2 receives the compressed audio/video data transmitted in a streaming manner in step 4. The audio/video data thus received is decoded into images and sounds which are output on the monitor apparatus 5.

With audio/video data transmitted and received in the above-described manner, the base station apparatus 1 may be established in an area remote from where the monitor apparatus 2 is used. This setup allows the user of the monitor apparatus 2 to watch TV broadcasts that are ordinarily not receivable from the user's current location. Naturally, the audio/video sources formed by the audio/video signals output by AV equipment connected to the base station apparatus 1 can also be received and output by the monitor apparatus 2 for the user to enjoy.

The above-described information transmitting/receiving system is predicated on the condition that the base station apparatus 1 and the monitor apparatus 2 communicate with each other on a one-to-one basis. It follows that, while the monitor apparatus 2 can get TV broadcasts not ordinarily receivable in the area where the apparatus 1 is being used, such out-of-area broadcasts rendered receivable are limited to those from the area where the corresponding base station apparatus 1 is set up. External audio/video sources that can be enjoyed are also limited to those from the AV equipment connected to the corresponding base station apparatus 1.

That is, even if the user wants to enjoy more audio/video contents than before, e.g., more TV broadcasts from more service areas or more audio/video sources from more pieces of AV equipment, such wishes are difficult to meet as long as the user's connection is subject to the requirement of one-on-one correspondence: the base station apparatus 1 and the monitor apparatus 2 must communicate with each other on a one-to-one basis.

SUMMARY OF THE INVENTION

It is therefore an object of the present invention to overcome the above and other deficiencies of the related art and to provide an information transmitting/receiving system that improves significantly on its conventional counterpart.

In carrying out the invention and according to one aspect thereof, there is provided an information transmitting/receiving system including an information transmitting apparatus and an information receiving apparatus; wherein the information transmitting apparatus includes: a first communicating section for effecting communications over a predetermined network; an information acquiring section for acquiring content information; a registration information managing section for creating and holding registration information denoting the information receiving apparatus registered for authorization to receive the content information from the information transmitting apparatus; an authenticating section which, if the information transmitting apparatus is requested to transmit the content information by a communication using the first communicating section, references for authentication the registration information in order to determine whether or not the information receiving apparatus requesting the content information transmission is authorized to receive the content information from the information transmitting apparatus; and a transmission controlling section which, if the requesting information receiving apparatus is found authorized to receive the content information as a result of the authentication by the authenticating section, causes the first communicating section to transmit the content information acquired by the information acquiring section to the information receiving apparatus requesting the content information transmission. And, the information receiving apparatus includes: a second communicating section for effecting communications over the predetermined network; an information inputting section for inputting content information transmitted over the network by a communication using the second communicating section; a registered information managing section for creating and holding registered information representing a plurality of units of the information transmitting apparatus with which the information receiving apparatus has registered for authorization to receive the content information as denoted in the registration information; and a communication controlling section for causing the second communicating section to effect a communication requesting any one of the units of the information transmitting apparatus indicated by the registered information to transmit the content information.

According to another aspect of the invention, there is provided an information transmitting apparatus including: a communicating section for effecting communications over a predetermined network; an information acquiring section for acquiring content information; a registration information managing section for creating and holding registration information denoting an information receiving apparatus registered for authorization to receive the content information from the information transmitting apparatus; an authenticating section which, if the information transmitting apparatus is requested to transmit the content information by a communication using the communicating section, references for authentication the registration information in order to determine whether or not the information receiving apparatus requesting the content information transmission is authorized to receive the content information from the information transmitting apparatus; and a transmission controlling section which, if the requesting information receiving apparatus is found authorized to receive the content information as a result of the authentication by the authenticating section, causes the communicating section to transmit the content information acquired by the information acquiring section to the information receiving apparatus requesting the content information transmission.

According to a further aspect of the invention, there is provided an information receiving apparatus including: a communicating section for effecting communications over a predetermined network; an information inputting section for inputting content information transmitted over the network by a communication using the communicating section; a registered information managing section for creating and holding registered information representing a plurality of units of an information transmitting apparatus with which the information receiving apparatus has registered for authorization to receive the content information; and a communication controlling section for causing the communicating section to effect a communication requesting any one of the units of the information transmitting apparatus denoted by the registered information to transmit the content information.

According to an even further aspect of the invention, there is provided an information transmitting/receiving method for use with an information transmitting apparatus and an information receiving apparatus, the information transmitting/receiving method including the steps of causing the information transmitting apparatus to carry out: a first communicating process for effecting communications over a predetermined network; an information acquiring process for acquiring content information; a registration information managing process for creating and holding registration information denoting the information receiving apparatus registered for authorization to receive the content information from the information transmitting apparatus; an authenticating process which, if the information transmitting apparatus is requested to transmit the content information by a communication using the first communicating process, references for authentication the registration information in order to determine whether or not the information receiving apparatus requesting the content information transmission is authorized to receive the content information from the information transmitting apparatus; and a transmission controlling process which, if the requesting information receiving apparatus is found authorized to receive the content information as a result of the authentication in the authenticating process, uses the first communicating process to transmit the content information acquired in the information acquiring process to the information receiving apparatus requesting the content information transmission. And the information transmitting/receiving method further including the steps of causing the information receiving apparatus to carry out: a second communicating process for effecting communications over the predetermined network; an information inputting process for inputting content information transmitted over the network by a communication using the second communicating process; a registered information managing process for creating and holding registered information representing a plurality of units of the information transmitting apparatus with which the information receiving apparatus has registered for authorization to receive the content information as denoted in the registration information; and a communication controlling process for causing the second communicating process to effect a communication requesting any one of the units of the information transmitting apparatus indicated by the registered information to transmit the content information.

Where the structures outlined above are in use, the information transmitting apparatus upon receiving a content transmission request carries out an authenticating process based on registration information so as to transmit content information only to the information receiving apparatus registered for authorization to receive content information. The information receiving apparatus may register with a plurality of units of the information transmitting apparatus for authorization to receive content information therefrom. It follows that by requesting a plurality of units of the information transmitting apparatus to transmit content information, a single unit of the information receiving apparatus may receive the requested content information from the plurality of units as long as the information receiving apparatus has duly registered with each of these units.

As outlined above, the inventive structures enable one unit of the information receiving apparatus to request the transmission of content information from a plurality of units of the information transmitting apparatus and to receive the transmitted information therefrom. The scheme thus allows each information receiving apparatus to acquire and utilize a wider range of content information in larger quantities from more diversified sources than before.

Other objects, features and advantages of the invention will become more apparent upon a reading of the following description and appended drawings.

BRIEF DESCRIPTION OF THE DRAWINGS

FIG. 4 is a tabular view illustrating a typical structure of a registration table held by the base station apparatus;

FIG. 5 is a tabular view presenting a typical structure of a registered status table held by the monitor apparatus;

DETAILED DESCRIPTION OF THE PREFERRED EMBODIMENTS

Preferred embodiments of this invention will now be described. What follows is a description of one preferred embodiment of the invention in the form of an information transmitting/receiving system for indoor use comprising a base station apparatus and a monitor apparatus interconnected wirelessly. The base station apparatus and the monitor apparatus correspond respectively to an information transmitting apparatus and an information receiving apparatus according to the invention.

Figure 1:
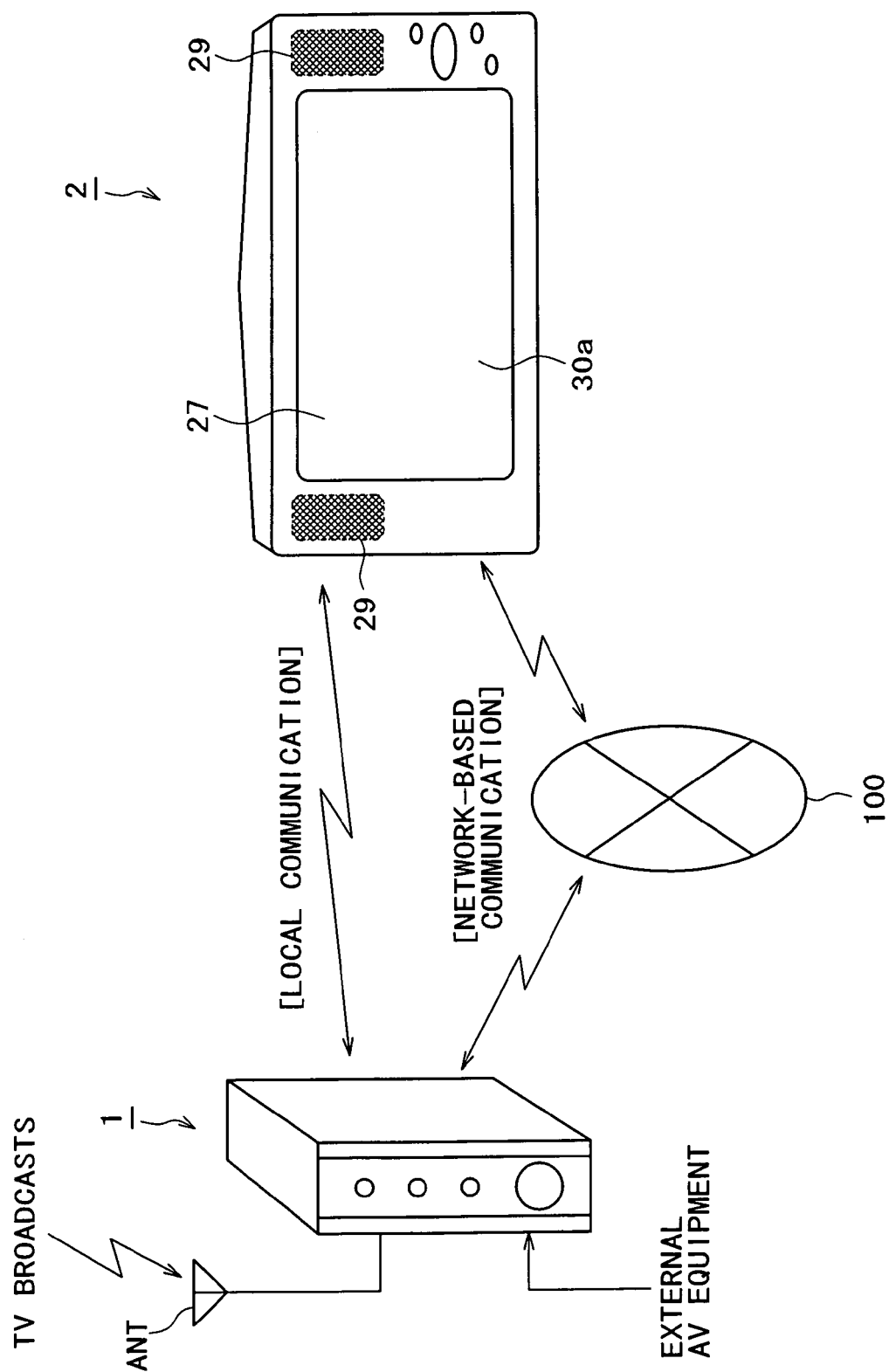
FIG. 1 is a schematic view indicating a basic configuration of an information transmitting/receiving system embodying this invention.

FIG. 1 schematically depicts a conceptual configuration of the information transmitting/receiving system embodying the invention. Although the inventive system involves having one monitor apparatus corresponding to a plurality of base station apparatuses, FIG. 1 shows the most basic system configuration for purpose of simplification and illustration, with one monitor apparatus corresponding to one base station apparatus.

Made up of a base station apparatus 1 and a monitor apparatus 2, the information transmitting/receiving system in FIG. 1 is illustratively utilized indoors. As will be discussed later, the two component apparatuses are designed to communicate with each other.

The base station apparatus 1 is fixedly set up where appropriate in the house. The apparatus 1 has the capability of selectively receiving TV broadcasts and demodulating the selected broadcast so as to derive audio/video information from the broadcast.

The base station apparatus 1 is typically equipped with an antenna ANT for receiving TV broadcasts as required by the TV broadcast receiving capability. Broadcast signals received by the antenna ANT are selectively demodulated by the base station apparatus 1 in order to acquire audio/video information constituting TV signals. The TV signals thus obtained are compression-encoded into audio/video data using a predetermined method.

The base station apparatus 1 of this invention is also equipped with video input terminals. Audio/video signals input to the video input terminals from external AV equipment are acquired as audio/video information which may be compression-encoded in the above-described manner into audio/video data.

The base station apparatus 1 also has the capability of connecting to the Internet (network). This allows the base station apparatus 1 to gain access to desired terminal equipment for communication over the Internet.

The base station apparatus 1 is capable of transmitting the audio/video data compression-encoded by radio waves as described. That is, the base station apparatus 1 may wirelessly transmit diverse kinds of content information such as images of selectively received TV broadcasts, audio/video data coming from AV equipment, and video information representative of interface images including Internet-transmitted pictures. Various types of data other than the video information can also be transmitted wirelessly. The information thus sent from the base station apparatus 1 is received by the monitor apparatus 2, to be described later.

The base station apparatus 1 and the monitor apparatus 2 are also capable of exchanging commands wirelessly. The commands are used by the monitor apparatus 2 to control the base station apparatus 1 and by the base station apparatus 1 to control the monitor apparatus 2.

The wireless communication feature mentioned above is designed to cover a radius of about 30 meters in practice. That means the base station apparatus 1 and monitor apparatus 2 are intended typically for indoor use or for a similar use environment involving relatively short distances to cover. In the description that follows, the above type of wireless communication may be called local communication where appropriate because the distances of communication are limited to local areas as opposed to Internet-based communications or the like over wide-ranging areas.

The monitor apparatus 2 is of a size and a shape illustratively suitable for the user to carry around indoors. The monitor apparatus 2 can receive and input signals wirelessly transmitted by radio waves from the base station apparatus 1. If the signal that is received and input is found to constitute content information made of compression-encoded audio/video data, the information is decoded by the monitor apparatus 2 in order to acquire the original audio/video data.

The monitor apparatus 2 has a display unit 27 made up of an LCD (liquid crystal display) or like display device. The video information acquired as part of the content information in the manner described above is displayed on the display unit 27 as images. That is, the monitor apparatus 2 is capable of outputting audio/video information derived from the TV broadcasts selectively received by the base station apparatus 1, audio/video information input from AV equipment, and interface images including Internet-transmitted pictures. When equipped with an audio information output feature including speakers 29, the monitor apparatus 2 can output sounds derived from the audio/video information as well as sounds corresponding to operations that may be performed on the interface images.

A touch-sensitive panel 30a is mounted on the screen of the display unit 27. Operations performed on the touch-sensitive panel 30a are detected and translated into operation information.

The operation information derived from the touch-sensitive panel 30a is transmitted as needed from an antenna to the base station apparatus 1 wirelessly. On receiving the operation information, the base station apparatus 1 executes corresponding control processes. The operations involving such exchanges of information permit switchover between monitoring and Internet capabilities of a TV set, a selection from TV broadcast channels, and a choice from among external audio/video sources.

As described, the base station apparatus 1 functions as an interface that supplies the monitor apparatus 2 with content information that can be acquired from the station's surroundings. That is, the base station apparatus 1 obtains audio/video information from TV broadcasts or from external AV equipment, and transmits the content information thus acquired to the outside.

The monitor apparatus 2 is also capable of presenting the user with images and sounds representative of the audio/video information obtained by the base station apparatus 1, and of accepting the user's input operations on this system.

In this embodiment, the monitor apparatus 2 is further provided with the ability to access the Internet. In other words, the base station apparatus 1 and monitor apparatus 2 constituting the information transmitting/receiving system can handle two kinds of network communications: local communications effected wirelessly by radio waves as described above, and Internet-based communications. The Internet connection, as with local communications, enables this embodiment to transmit content information from the base station apparatus 1 to the monitor apparatus 2 and permits command exchanges between the two component apparatuses.

Figure 2:
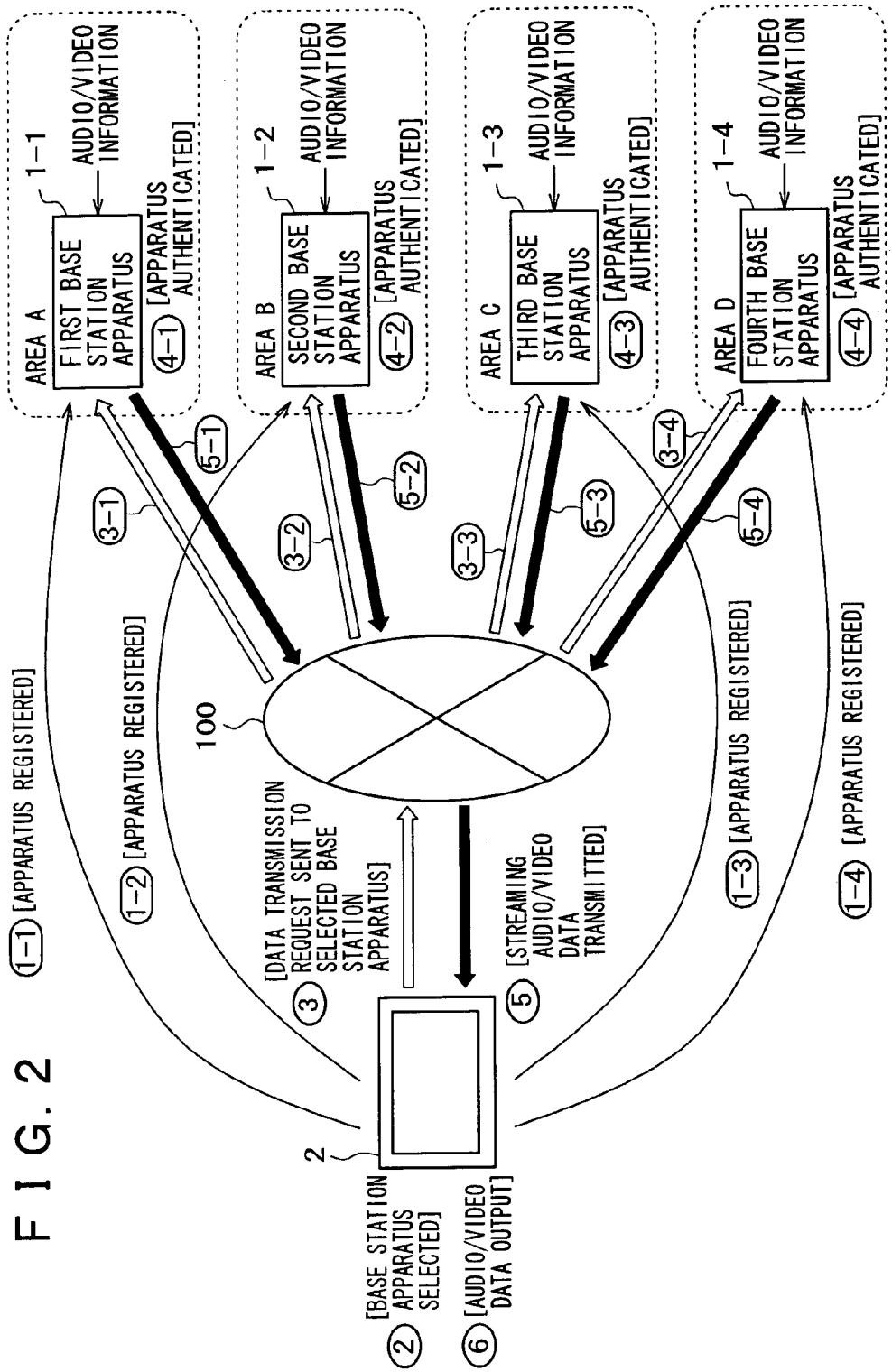
FIG. 2 is an explanatory view showing how the information transmitting/receiving system embodying the invention operates in steps.

On the precondition that one base station apparatus 1 be paired with one monitor apparatus 2 in its basic configuration, this embodiment constitutes an information transmitting/receiving system as illustrated in FIG. 2. The information transmitting/receiving system in FIG. 2 is structured in such a manner that one monitor station 2 is connected to a plurality of base station apparatuses 1 over the Internet 100. Although the scope of this invention does not limit the number of base station apparatuses 1 making up part of the information transmitting/receiving system, the setup of FIG. 2 indicates four base station apparatuses 1-1 through 1-4 by way of example. As mentioned above, each of the base stations 1-1 through 1-4 is capable of obtaining audio/video information formed by audio/video signals derived from the received and demodulated TV broadcasts and by audio/video signals input from external AV equipment.

For FIG. 2, it is assumed that the base stations 1-1 through 1-4 are located in different areas A through D respectively. It is also assumed that the areas A through D correspond respectively to different TV broadcast service areas (i.e., covering different broadcast channels). That is, each of the base stations 1-1 through 1-4 receives TV broadcasts on different broadcast channels. The user may use the monitor apparatus 2 either outside the areas A through D or in any one of these four areas.

Described below with reference to FIG. 2 is how the information transmitting/receiving system embodying this invention operates in steps when used. The sequence in which these steps are carried out is indicated by natural numbers placed in circles and in rough ellipses in the figure.

In step 1 (steps 1-1, 1-2, 1-3 and 1-4), an apparatus registration process is carried out to establish the relation of correspondence between the monitor apparatus 2 and the base station apparatus 1. Specifically, the user registers the monitor apparatus 2 with each of the base stations 1-1 through 1-4. The registration is effected so that the monitor apparatus 2, once registered, is authorized to receive content information from the selected base station apparatus 1 over the Internet 100.

After the registration, the base stations 1-1 through 1-4 each handle the registered monitor apparatus 2 as a legitimate apparatus to which content information may be transmitted over the Internet 100. The monitor apparatus 2 recognizes that the base stations 1-1 through 1-4 are now capable of providing it with transmission of content information over the Internet 100.

It should be noted that while audio/video data is transmitted and received over the Internet 100 between the monitor apparatus 2 and the base station apparatus 1 (1-1 through 1-4) along with related commands, exchanges of the commands for getting the monitor apparatus 2 to register with the base station apparatuses in step 1 are to be performed here by local communications as described above with reference to FIG. 1.

In other words, the apparatus registration process cannot be accomplished over the Internet; it can only be performed by the monitor apparatus 2 and base station apparatus 1 located close enough to one another for local communications to take place therebetween.

The constraints above are imposed primarily for the sake of security. If the apparatuses were allowed to register over the Internet 100, a malicious third party might impersonate the legitimate user and register an illicit monitor apparatus.

More realistically, only the user who possesses both the monitor apparatus 2 and the base station apparatus 1 can position them close enough to one another to carry out local communications between them. If the apparatus registration is permitted only through local communications as described above, then only the user in possession of the legitimate apparatuses can actually register them. This is a highly effective countermeasure against attempts at illicit apparatus registration.

Suppose now that following the apparatus registration in step 1, the user wants to view on his or her monitor apparatus 2 the audio/video information acquired by the base station apparatus 1 and that the user makes suitable operations on the monitor apparatus 2 with a view to getting the desired information monitored. In that case, the monitor apparatus 2 causes the display unit 27 to display a GUI (graphical user interface) image corresponding to a selection from candidate base station apparatuses. That is, step 2 illustratively involves having the GUI image output for a choice from among candidate base station apparatuses and getting the desired base station apparatus selected in keeping with the GUI image being output.

More specifically, the GUI image for the selection from candidate base station apparatuses presents in step 2 those base stations 1 with which the monitor apparatus 2 has registered. In this case, the four base stations 1-1 through 1-4 are displayed as the candidates. The user is prompted illustratively to operate on the touch-sensitive panel 30$a$ showing the GUI image. It is at this point that the user chooses the base station apparatus that can transmit the user's preferred content information. For example, if the user wants to view a certain TV channel being broadcast in the area A, the user performs an operation to select the first base station apparatus 1-1 located in the area A.

With the desired base station apparatus selected as described, the user performs an operation to start monitoring of the audio/video information in question. These operations are followed by step 3 (step 3-1, 3-2, 3-3 or 3-4). Overall, step 3 involves getting the monitor apparatus 2 to send over the Internet 100 a command for requesting the transmission of audio/video data from the base station apparatus selected in step 2. Illustratively, if the second base station apparatus 1-2 was selected in step 2, then the transmission request command is sent in step 3 as step 3-2 from the monitor apparatus 2 to the base station apparatus 1-2.

The command issued at this point is arranged to request audio/video data transmission by designating details of the content information making up the requested data. For example, the command may specify the channel number of the user-selected TV broadcast along with the request for data transmission.

Upon receipt of the data transmission request command sent in step 3, the base station apparatus proceeds to carry out apparatus authentication in step 4 (step 4-1, 4-2, 4-3 or 4-4). That is, the base station apparatus checks to determine whether the monitor apparatus 2 having sent the data transmission request command is a duly registered apparatus to which audio/video data is allowed to be sent on request. If the request command is sent to the second base station apparatus 1-2, that apparatus 1-2 alone carries out the authentication process in step 4 which, in this case, consists of step 4-1.

If the monitor apparatus having sent the request command is found unregistered as a result of the authentication process in step 4, a suitable process is carried out to notify the requesting monitor apparatus of an error, not shown. Consequently the requested content information will not be transmitted to that monitor apparatus.

If the requesting monitor apparatus is found registered as a result of the authentication process, then step 5 is reached. In step 5, the base station apparatus 1 transmits the requested audio/video data over the Internet to the monitor apparatus having sent the data transmission request command. At this point, the base station apparatus 1 carries out a control process for acquiring the audio/video data designated by the request command. Illustratively, if the audio/video data designated by the data transmission request command is the TV broadcast on a particular broadcast channel, then control is exercised to have an internal TV tuner tune in to the TV broadcast channel in question. The audio/video data derived from the TV broadcast on the selected broadcast channel is transmitted (in compressed form) over the Internet to the requesting monitor apparatus 2. In this case, the compressed audio/video data is sent on a streaming basis over the network.

The video/audio data sent in streaming fashion is received by the monitor apparatus 2 having issued the data transmission request. The monitor apparatus 2 decodes the received audio/video data (i.e., streaming data) in real time for output onto the display unit 27 and through the speakers 29 as images and sounds.

As outlined above with reference to FIG. 2, the information transmitting/receiving system embodying this invention gets one monitor apparatus 2 to register with a plurality of base station apparatuses 1. In this setup, each monitor apparatus 2 may select any one of the multiple base station apparatuses 1 with which the monitor apparatus 2 has registered so as to receive the audio/video data obtained by the selected base station apparatus.

As opposed to the conventional information transmitting/receiving system having each monitor apparatus 2 paired with only one base station apparatus 1, the inventive system has each monitor apparatus 2 corresponding to a plurality of base station apparatuses 1. That means each monitor apparatus 2 has more audio/video content to receive than before from an increased number of base station apparatuses 1.

Illustratively, as shown in FIG. 2, the four base station apparatuses 1-1 through 1-4 are distributed in four different service areas of TV broadcasts. The monitor apparatus 2 can then receive TV broadcasts on suitable channels from any one of the four different service areas.

As discussed above with reference to FIG. 1, each base station apparatus 1 of this embodiment may be connected to external AV equipment as an audio/video source. The audio/video information output by the connected AV equipment is acquired by the base station apparatus 1 and transmitted to the monitor apparatus 2 as audio/video data. The larger the number of base station apparatuses 1 corresponding to the monitor apparatus 2, the larger the number of pieces of AV equipment connectable to the base station apparatuses 1. The possible connections of the external AV equipment translate into more audio/video sources available in addition to the TV broadcasts.

In the manner described, the information transmitting/receiving system embodying this invention allows the user to enjoy more content that is output onto the monitor apparatus 2 from a larger number of audio/video sources than ever before.

Audio/video data, commands for requesting transmission of such audio/video data, and responses to these commands are transmitted and received over the Internet 100. Communications based on the Internet 100 or like networks are not limited by the physical distances between the terminals involved. In other words, there are no constraints on the physical distances that may exist between the terminals as long as the latter have access to the Internet.

Once the monitor apparatus 2 has registered with the base station apparatuses 1-1 through 1-4, it is possible to locate the base stations in desired areas remote from the monitor apparatus 2. As described above with reference to FIG. 2, if the base stations apparatuses 1-1 through 1-4 are placed in the respectively different areas, the base stations except at least one station are positioned in areas remote from the monitor apparatus 2. This setup is readily implemented because audio/video data can be exchanged over the network.

Today, the Internet covers virtually the whole world. It follows that the multiple base station apparatuses 1 corresponding to each monitor apparatus 2 of this embodiment may be located across borders. For example, the monitor apparatus 2 is used in Japan while some of the corresponding base station apparatuses 1 with which the monitor apparatus 2 has registered are located in countries other than Japan and are connected to the monitor apparatus 2 via the Internet. In such a case, the TV tuner of each base station apparatus 1 placed in a foreign country is made compatible with the transmission standards of that country. This arrangement makes it possible for the user manipulating the monitor apparatus 2 in Japan to watch TV broadcasts of other countries with ease.

Figure 3:
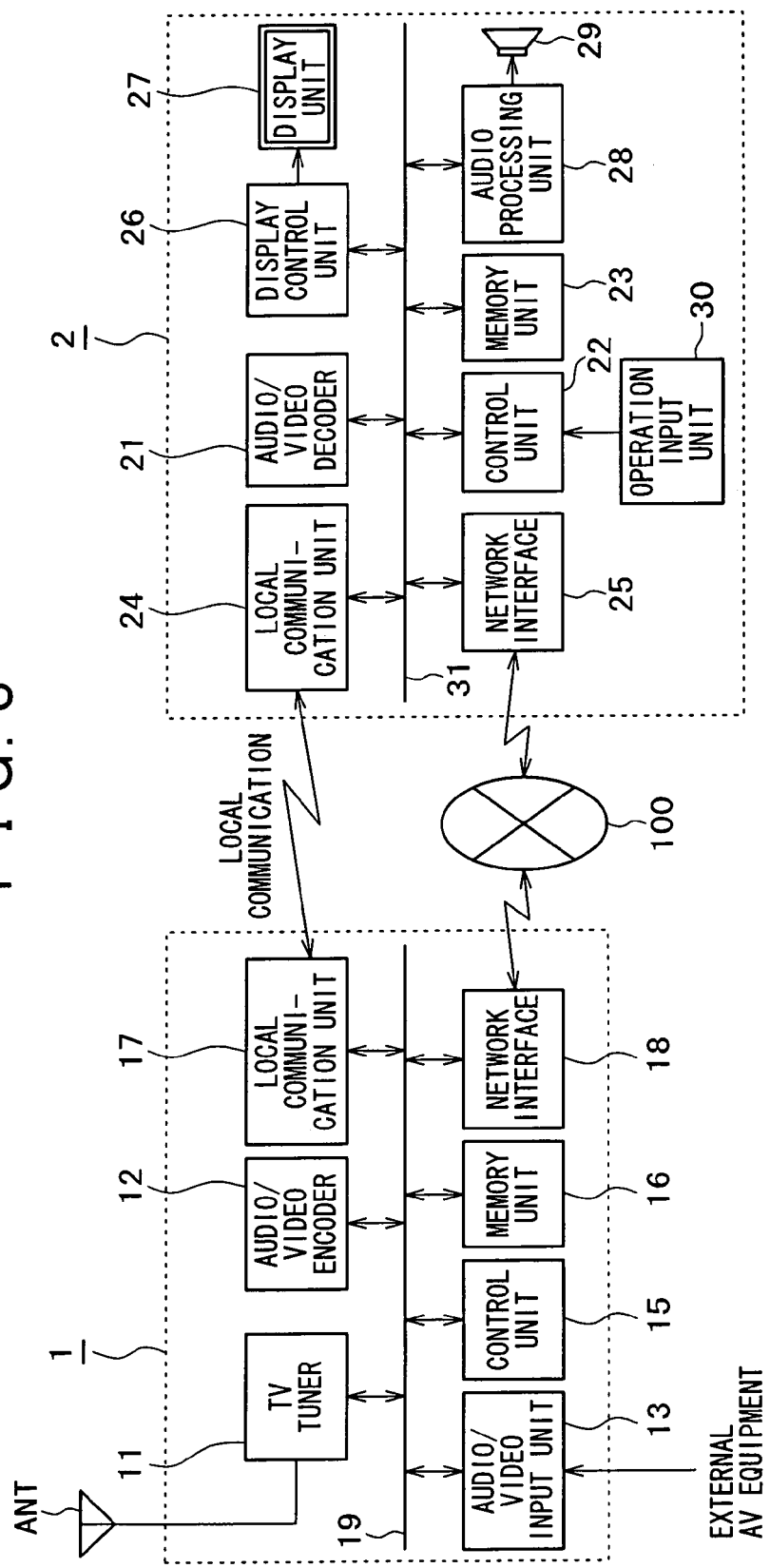
FIG. 3 is a block diagram depicting typical internal structures of a base station apparatus and a monitor apparatus making up the information transmitting/receiving system embodying the invention.

What follows is a description of typical structures required of the information transmitting/receiving system embodying the invention for carrying out the operating steps discussed above with reference to FIG. 2. Typical internal structures of the base station apparatus 1 and of the monitor apparatus 2 are first described below with reference to FIG. 3. FIG. 3 indicates one base station apparatus 1 and one monitor apparatus 2.

In FIG. 3, the base station apparatus 1 has a TV tuner 11 capable of receiving predetermined TV broadcasts, and of selecting and demodulating any one of the received broadcasts. Broadcast waves received by the antenna ANT are input to the TV tuner 11 for selecting and demodulating processes thereby to obtain the audio/video signals of a designated channel illustratively under control of a control unit 15. The audio/video signals thus acquired are transferred to an audio/video encoder 12 illustratively through an internal data bus 19.

An audio/video input unit 13 acquires audio/video data by inputting audio/video signals from external AV equipment. In practice, the audio/video input unit 13 is furnished with predetermined number of input terminals which comply with a suitable signaling system and which admit audio/video signals coming from the attached AV equipment. The audio/video input unit 13 may include a selector that selects, out of the audio/video signals input through the terminals, those audio/video signals designated illustratively by the control unit 15. The audio/video input unit 13 may also include an A/D converter for converting analog input audio/video signals into digital signals. The audio/video data output by the audio/video output unit 13 is also transferred to the audio/video encoder 12 over the internal data bus 19 under control of the control unit 15.

The audio/video encoder 12 inputs the audio/video data transferred over the internal data bus 19 as described and encodes the input data in accordance with a predetermined compression-encoding method. At present, the compression-encoding method to be adopted may be that which is based on MPEG (Moving Picture Experts Group) standards but is not limited thereto. The compressed audio/video data output by the audio/video encoder 12 is transferred to a local communication unit 17 or to a network interface 18, to be discussed below, under control of the control unit 15.

In the information transmitting/receiving system embodying this invention, as described above with reference to FIG. 1, the base station apparatuses 1 and the monitor apparatus 2 are capable of communicating with outside entities by both local communications (e.g., short-distance wireless communications) and via the Internet. The base station apparatuses 1 and the monitor apparatus 2 can also communicate with one another by local communications or via the Internet.

The local communication unit 17 carriers out communication processes in keeping with a predetermined communication protocol adopted for the local communication of this embodiment. For example, TCP/IP is adopted as the protocol for local communications to be performed by this embodiment. In other words, local communications are based on the same protocol as Internet-based communications. TCP/IP has the advantage of being easy to use and to apply because it has received widespread acceptance over the Internet.

At the time of transmission, outgoing data is illustratively turned into packets by the local communication unit 17 for TCP/IP-compatible data exchanges. The packetized data is subjected to carrier modulation or other necessary processes before being output by radio waves. Upon reception, incoming data transmitted by radio waves is received and demodulated in increments of packets by the local communication unit 17. The received data is depacketized and otherwise processed according to the TCP/IP communication protocol whereby actual data such as commands and content information are acquired.

Whereas local communications with this embodiment are effected by radio waves, there is no fixed radio wave communication method to be adopted. Alternatively, infrared data transmission may be utilized as long as stable wireless communications are ensured over short distances between the base station apparatus 1 and the monitor apparatus 2. As another alternative, especially for apparatus registration to be discussed later, it is possible to adopt a wired communication method illustratively based on USB (universal serial bus) standards.

Communications over the Internet (network) 100 are carried out by the network interface 18. Since TCP/IP is the well-known communication protocol adopted extensively for Internet-based communications, the network interface 18 performs its processes in a manner suitable for executing communications in accordance with TCP/IP.

At the time of transmission, outgoing data is packetized as described above or otherwise processed by the network interface 18 for TCP/IP-compatible data exchanges. The processed data is transmitted to its destination terminal over the Internet 100. Upon reception, incoming data transmitted from its source on the Internet 100 is received and subjected to depacketization or other necessary demodulating processes by the network interface 18 whereby actual data such as commands and content information are acquired.

In practice, the network interfaced 18 may be structured to be compatible with a LAN such as the Ethernet (registered trademark). This structure allows the network interface 18 to utilize so-called broadband channels such as xDSL (digital subscriber line), FTTH (fiber to the home) and CATV (cable television). When equipped with a modem, the network interface 18 may have access to the Internet by way of a telephone line.

As described above, the audio/video data compression-encoded by the audio/video encoder 12 is destined for the monitor apparatus 2. If the compression-encoded audio/video data is to be transmitted by local communications to the monitor apparatus 2, the control unit 15 causes the data to enter the local communication unit 17 via the internal data bus 19. In turn, the local communication unit 15 subjects the input compression-encoded audio/video data to packetization, carrier modulation or other necessary processes as mentioned above and transmits the processed data by radio waves.

If the compression-encoded audio/video data is to be sent over the Internet 100 to the monitor apparatus 2, the control unit 15 causes the data to enter the network interface 18 via the internal data bus 19. The network interface 18 subjects the input compression-encoded data to packetization and other necessary processes as well and transmits the processed data to its destination over the Internet 100. If the compression-encoded audio/video data is sequenced in time (i.e., has temporal continuities) like ordinary video or audio signals, the data may be output in temporally sequence fashion, i.e., as so-called streaming data. This illustratively requires the control unit 15 to suitably time both the transfer of the compressed audio/video data from the audio/video encoder 12 to the network interface 18 and the output of the data from the network interface 18 to the outside in packets.

As explained above, the control unit 15 provides various controls on the base station apparatus 1. The control unit 15 is illustratively composed of a microcomputer constituted by a CPU (central processing unit), a ROM and a RAM. As is well known, the CPU performs its operations in keeping with programs and settings held in the ROM. The RAM is a memory into which the programs to be executed by the CPU are loaded. The RAM also provides a work area for use by the CPU.

A memory unit 16 is formed illustratively by an EEPROM (electrically erasable and programmable read only memory), a flash memory, or other suitable memory device which allows its content to be updated as needed and which retains the content when power is removed. With this embodiment, the memory unit 16 holds a registration table containing relevant information.

The registration table stores registration status indicating the monitor apparatuses 2 which have registered with this base station apparatus 1 and which are thereby authorized to receive content information from this base station. The registration table is typically structured as a list of monitor apparatus IDs representative of the registered monitor apparatuses as shown in FIG. 4. With the monitor apparatus IDs listed therein, the registration table indicates the registered monitor apparatuses authorized to receive content information.

Each monitor apparatus ID may be any notation that enables the base station apparatus 1 to identify the communicating monitor apparatus sending commands to the base station over the Internet, as will be discussed later. For this embodiment, the MAC (media access control) address of each monitor apparatus is used as its monitor apparatus ID. As is commonly known, the MAC address is a physical address allocated to each apparatuses during its manufacture. How the apparatuses are registered and how the registration table is created will be discussed later.

In addition to what is stored in the registration table, the memory unit 16 accommodates, but is not limited to, the settings to be updated to reflect processes or operations performed by the base station apparatus 1, and patch-up data for modifying the programs to be executed by the CPU. These features of the memory unit 16 for the base station apparatus apply as well to a memory unit 23 of the monitor apparatus 2 in which a registered status table is to be stored, as will be described later.

Alternatively, the base station apparatus 1 may be equipped with a hard disk drive (HDD) capable of storing content data including audio/video data. In that structure, the content data held on the HDD may be transmitted to the monitor apparatus 2 by local communications or over the Internet.

The monitor apparatus 2 also shown in FIG. 3 has a local communication unit 24 and a network interface 25 as means for communicating with the outside. The local communication unit 24 and network interface 25 may be structured to correspond respectively to the above-described local communication unit 17 and network interface 18 in the base station apparatus 1.

When the local communication unit 17 of the base station apparatus 1 transmits compressed audio/video data as content information in the manner described above, the local communication unit 24 of the monitor apparatus 2 receives and demodulates the compressed audio/video data for data extraction.

Likewise, when the network interface 18 of the base station apparatus 1 transmits compressed audio/video data as content information, the network interface 25 of the monitor apparatus 2 receives the compressed audio/video data and subjects the received data to depacketization and other demodulating processes for data extraction.

The compressed video/audio data extracted by the local communication unit 24 or by the network interface 25 as described above is transferred to an audio/video decoder 21 via an internal data bus 31 under control of a control unit 22.

The audio/video decoder 21 inputs the compressed audio/video data transferred as described, and decodes the input data in accordance with the format of the compressed data so as to obtain decompressed audio and video signal data. Following the acquisition of the decompressed audio and video signal data, the video signal data is transferred to a display control unit 26 and the audio signal data is forwarded to an audio processing unit 28 under control of the control unit 22.

Upon receipt of the video signal data from the audio/video decoder 21, the display control unit 26 subjects the received data to signal processing for the data to be displayed on a display unit 27 and controls the display unit 27 accordingly. When a GUI image is to be output and displayed allowing the user to operate on the touch-sensitive panel, the display control unit 26 generates video data constituting the GUI image under the direction of the control unit 22 and carries out a control process for the display unit 27 to display the GUI image. If the video signal data transferred from the audio/video decoder 21 is used as a main image and if the GUI image is to be superposed onto a specific position of the main image, an image signal process necessary for providing the superposed display is performed by the display control unit 26.

The display unit 27 is constituted by a display device such as an LCD (liquid crystal display). As shown in FIG. 1, the display unit 27 is set up in such a manner that its display screen appears all over the front part of the monitor apparatus. When the display control unit 26 carries out its operations as described above, the images derived from the audio/video data acquired and transmitted by the base station apparatus 1 are displayed on the screen of the display unit 27 along with the GUI image.

An audio signal processing unit 28 inputs the audio signal data transferred from the audio/video decoder 21, subjects the input data to a predetermined digital audio signal process, D/A conversion, amplification and other processes; and outputs the processed data through the speakers 29.

The decoding process by the audio/video decoder 21 deals with compressed audio/video data that comes in a number of types. Illustratively, the compressed audio/video data that can be handled by this decoder includes: audio signal data and video signal data which are compression-encoded in such a manner that their time bases will be synchronized during reproduction; compression-encoded video signal data alone; or compression-encoded audio signal data alone. It is also possible for the audio/video decoder 21 to decode image data in a predetermined still-picture format.

With this embodiment, the audio signal data and video signal data compression-encoded to have their time bases synchronized for reproduction are required to be transmitted as streaming data and reproduced in temporally sequenced fashion. When such audio/video data is received by the monitor apparatus 2, the audio/video decoder 21 decodes the received data in a manner causing the audio output and the video output to be synchronized during reproduction. With a view to reproducing the decoded audio and video signal data without interruption, the control unit 22 controls the audio/video decoder 21 as to how to time both the decoding of the data and the transfer of the decoded data to the display control unit 26 or audio processing unit 28.

In the manner described above, TV broadcasts received and demodulated by the base station apparatus 1, as well as the audio/video information input from external AV equipment through the audio/video input unit 13, are transmitted to the monitor apparatus 2. In turn, the monitor apparatus 2 outputs the received data and information as sounds and images for the user to enjoy.

An operation input unit 30 shown in FIG. 3 as part of the monitor apparatus 2 refers generically to operating elements and operation inputting blocks attached to the monitor apparatus 2 as well as to devices for generating commands reflecting the operations made on these elements and blocks and for outputting the generated commands to the control unit 22. For these purposes, the operation input unit 30 is structured to include as well the touch-sensitive panel 30a mounted on the display unit 27.

The operation input unit 30 is also structured to include a remote controller furnished apart from the monitor apparatus 2, as well as arrangements for receiving command signals sent from the remote controller and for generating operation commands reflecting the received command signals. Neither the remote controller nor the related arrangements are shown.

Given operation commands from the operation input unit 30, the control unit 22 exercises various controls to effect the operations reflecting the received commands. For example, if an operation is performed in a manner being conclusive within the monitor apparatus, as when an operation is carried out to control the brightness of the LCD on the display unit 27, the control unit 22 causes the display control unit 26 to adjust the luminance of LCD backlights as specified.

The operation input unit 30 of the monitor apparatus 2 is further structured to control diverse forms of performance by the base station apparatus 1 when operated suitably. For example, suppose that the operation input unit 30 is operated to change the broadcast channels being received selectively by the TV tuner 11 of the base station apparatus 1. In that case, the operation made on the operation input unit 30 is translated into an operation command that is input to the control unit 22. In turn, the control unit 22 causes the local communication unit 24 or network interface 25 to send a command for requesting the channel change. If local communication with the base station apparatus 1 has been established, the control unit 22 instructs the local communication unit 24 to transmit the channel change request command; if communication with the base station apparatus 1 has been established over the Internet, the control unit 22 causes the network interface 25 to send the request command.

The channel change request command is sent from the local communication unit 24 or from the network interface 25 to the base station apparatus 1 under control of the control unit 22. The base station apparatus 1 receives and demodulates the command coming from the local communication unit 24 or network interface 25 at the local communication unit 17 or the network interface 18, and forwards the received command to the control unit 15. Given the command, the control unit 15 causes the TV tuner 11 to change the channels as requested by the command. As a result, the audio/video output on the monitor apparatus 2 is switched from the currently output broadcast channel to the channel newly designated by the user.

The control unit 22 exercises diverse controls on the monitor apparatus 2. The control unit 22 is composed of a microcomputer constituted by a CPU (central processing unit), a ROM and a RAM.

Like the memory unit 16 of the base station apparatus 1, the memory unit 23 of the monitor apparatus 2 allows its content to be updated as needed and retains the content when power is removed. The memory unit 23 holds a registered status table containing relevant information (registered information).

The registered status table indicates one or more base station apparatuses 1 with which this monitor apparatus 2 has registered and which thereby authorize the monitor apparatus 2 to receive transmitted content information. That is, the registered status table lists the base station apparatuses 1 corresponding to the monitor apparatus 2 in question (the listed apparatuses are called the corresponding base station apparatuses hereunder where appropriate).

As shown in FIG. 5, the registered status table is structured as a list of base station apparatus IDs representative of the corresponding base station apparatuses. As mentioned earlier, the MAC address of each base station apparatus 1 is adopted as its base station apparatus ID that allows the monitor apparatus 2 to identify the communicating base station apparatus 1 during exchanges of commands over the Internet.

The base station apparatus 1 and the monitor apparatus 2 making up the information transmitting/receiving apparatus embodying this invention are each equipped with the capability to access the Internet (network). The Internet connection capability may be used to receive Internet-based services other than the data communications between the base station apparatus 1 and the monitor apparatus 2. Illustratively, websites on the Internet may be accessed and their contents browsed. Electronic mails may also be sent and received over the Internet. These services may be obtained by simply installing into the inventive information transmitting/receiving system suitable application software (called network applications) for browsing websites and for carrying out e-main exchanges (using a so-called mailer).

Equipped with the Internet connection capability, the base station apparatus 1 and the monitor apparatus 2 constituting this embodiment are each capable of having such network applications installed therein for website browsing and e-mail exchanges. The network applications, when installed in the base station apparatus 1, allow the apparatus 1 to access websites and to transmit and receive e-mails. In addition, GUI images of the network applications are sent from the base station apparatus 1 to the monitor apparatus 2. In turn, the monitor apparatus 2 displays the received GUI images and enables the user to operate on the displayed GUI images. GUI-related operations performed on the monitor apparatus 2 cause corresponding commands to be exchanged between the monitor apparatus 2 and the base station apparatus 1 in such a manner that the network applications running on the base station apparatus 1 are controlled as desired in operation.

When the network applications are installed into the monitor apparatus 2, the scope of their performance is limited to the monitor apparatus 2 alone. That is, the applications allow the monitor apparatus 2 to access websites and to exchange e-mails on its own.

Figure 6:
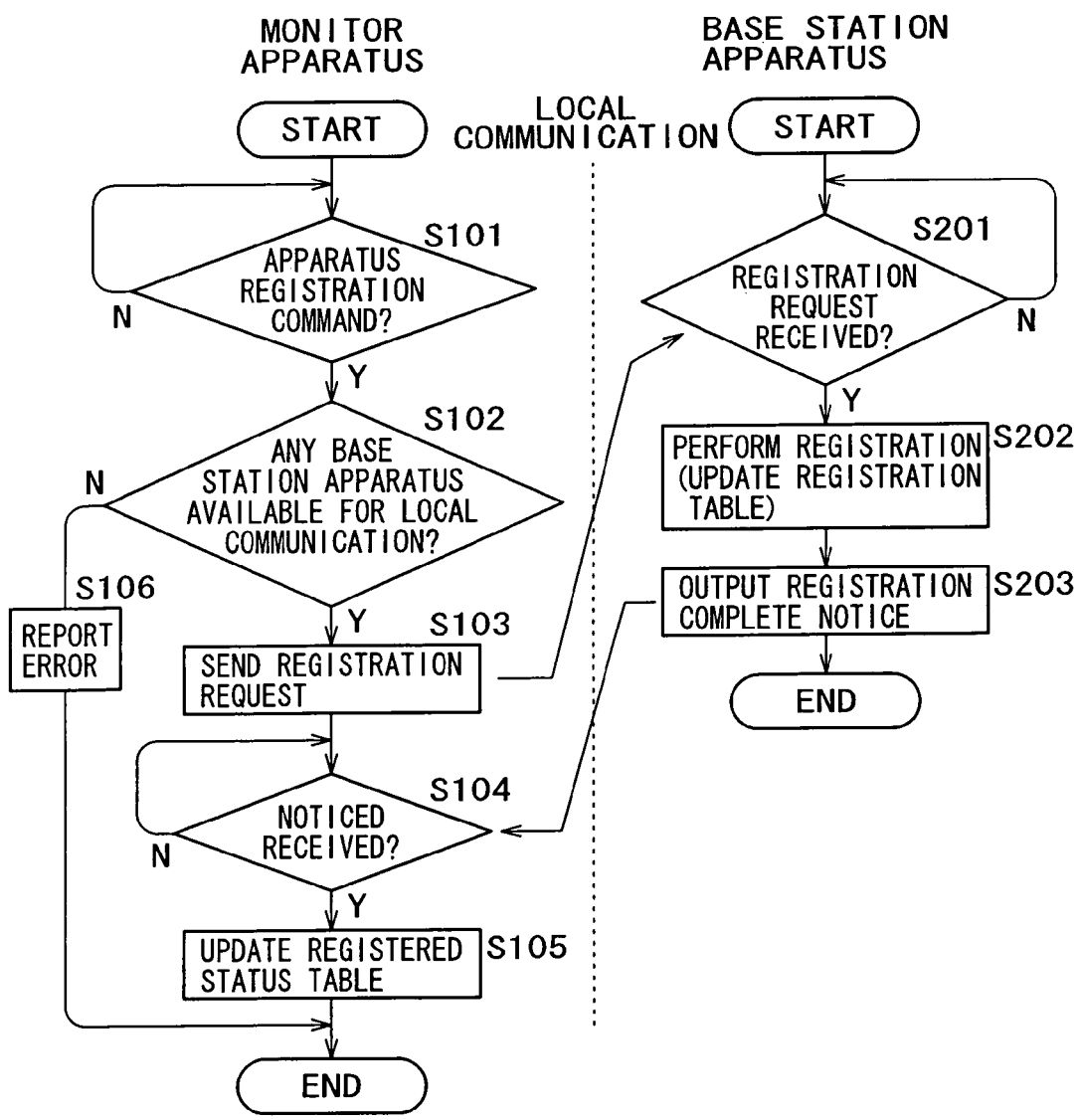
FIG. 6 is a flowchart of steps constituting a registering process.

The flowchart of FIG. 6 shows detailed steps constituting what was discussed above as step 1 for apparatus registration with reference to FIG. 2. Referring to FIG. 6, it is assumed that the control unit 15 performs processes for the base station apparatus 1 in accordance with the programs held in an internal ROM and that the control unit 22 carries out processes for the monitor apparatus 2 in keeping with the programs kept in an internal ROM. It should be noted again that apparatus registration must be accomplished by local communications between the base station apparatus 1 and the monitor apparatus 2.

In step S101 of FIG. 6, the monitor apparatus 2 waits for apparatus registration to be designated. Illustratively, a check is made to determine if the user operates on the monitor apparatus 2 to designate apparatus registration. The operation, when performed, is translated into a command for designating apparatus registration. The apparatus registration command, when recognized, is interpreted as the affirmative result of the check in step S101, and step S102 is reached accordingly.

In step S102, a check is made to determine whether there exists any base station apparatus 1 available for communication with the local communication unit 24. Illustratively, the control unit 22 instructs the local communication unit 24 to perform communication verification. In response, the local communication unit 24 initiates communications for query to see if any base station apparatus responds to the query. Whether there is any base station apparatus that has responded or there is no such base station apparatus available, the control unit 22 is notified thereof. If the user has set up any base station apparatus 1 with which to register the monitor apparatus 2 within a range narrow enough for the two apparatuses to communicate with each other, that base station apparatus 1 is recognized as the available base station apparatus 1 having responded to the query. If there is no base station apparatus 1 located close enough for the monitor apparatus 2 to communicate locally, then the control unit 22 is notified of the absence of any base station apparatus having responded to the query.

If the result of the check in step S102 is negative based on the notice from the local communication unit 24, i.e., if there is no base station apparatus 1 available for communication with the local communication unit 24, then step S106 is reached. In step S106, an error message is typically presented to the user in images or sounds, and the processing of FIG. 6 is brought to an end.

With transition from step S102 to step S106 executed, local communications fail to be established and apparatus registration is not accomplished. If the result of the check in step S102 is affirmative, i.e., if there exists any base station apparatus 1 available for communication with the local communication unit 24, then step S102 is followed by step S103.

In step S103, a control process is executed whereby an apparatus registration request command is transmitted to the base station apparatus 1 found available in step S102 for local communication. More specifically, the control unit 22 issues the command for requesting apparatus registration in a predetermined command exchange format, and instructs the local communication unit 24 to send the apparatus registration request command to its destination, i.e., to the base station apparatus 1 found available for communication. In turn, the local communication unit 24 transmits the issued command to the base station apparatus 1 by local communication.

For this embodiment, the command to request apparatus registration and a response to that request are defined only in the predetermined command exchange format for local communications and not in any command exchange format for Internet (network) communications. Following the above-described check in step S102, the apparatus registration request command is transmitted only by local communications. These arrangements ensure that apparatus registration is carried out only by local communications.

The base station apparatus 1, for its part, waits for an apparatus registration request command to arrive in step S201. When the command to request apparatus registration is transmitted in step S103 as described above, the command is received and demodulated by the local communication unit 17 of the base station apparatus 1. When the received command is transferred from the local communication unit 17 to the control unit 15, the command is recognized as the affirmative result of the check in step S201, and step S202 is reached accordingly.

In step S202, a registration process is carried out to register the monitor apparatus 2 having sent the apparatus registration request command. More specifically, the MAC address of the requesting monitor apparatus 2 is acquired as its ID which is then written to the registration table held in the memory unit 16 (so that the table is updated). The MAC address may be obtained illustratively when the MAC address of the command-transmitting monitor apparatus is included in the format of the apparatus registration request command. In this case, the control unit 15 of the base station apparatus 1 acquires the MAC address by recognizing what is contained in the received command. Alternatively, step S202 may be replaced by a process, not shown in FIG. 6, in which the base station apparatus 1 sends to the monitor apparatus 2 a command to request a MAC address so that the monitor apparatus 2 may return its MAC address in response.

When the registration process of step S202 is completed, step S203 is reached. In step S203, the local communication unit 17 notifies the monitor apparatus 2 that the registration has now been completed on the side of the base station apparatus 1. The notice is given as a response to the apparatus registration request command received earlier in step S201.

Meanwhile, the monitor apparatus 2 waits for a registration complete notice to arrive in step S104 in response to the apparatus registration request command transmitted earlier in step S103. When it is recognized by the control unit 22 in step S104 that the registration complete notice transmitted as a result of the processing in step S203 has been received by the local communication unit 24 of the monitor apparatus 2, step S105 is reached.

By the time step S105 is reached, the monitor apparatus 2 has registered itself with the base station apparatus 1 and has become a registered monitor apparatus for that base station apparatus 1. In step S105, the monitor apparatus 2 stores the ID of the base station apparatus 1 with which it has registered into the registered status table held in the memory 23 (thereby updating the registered status table). In this case, too, the ID of the base station apparatus 1 is composed of its MAC address. The MAC address may be acquired in the same manner as when the registration table is updated as discussed earlier in step S202.

Figure 7:
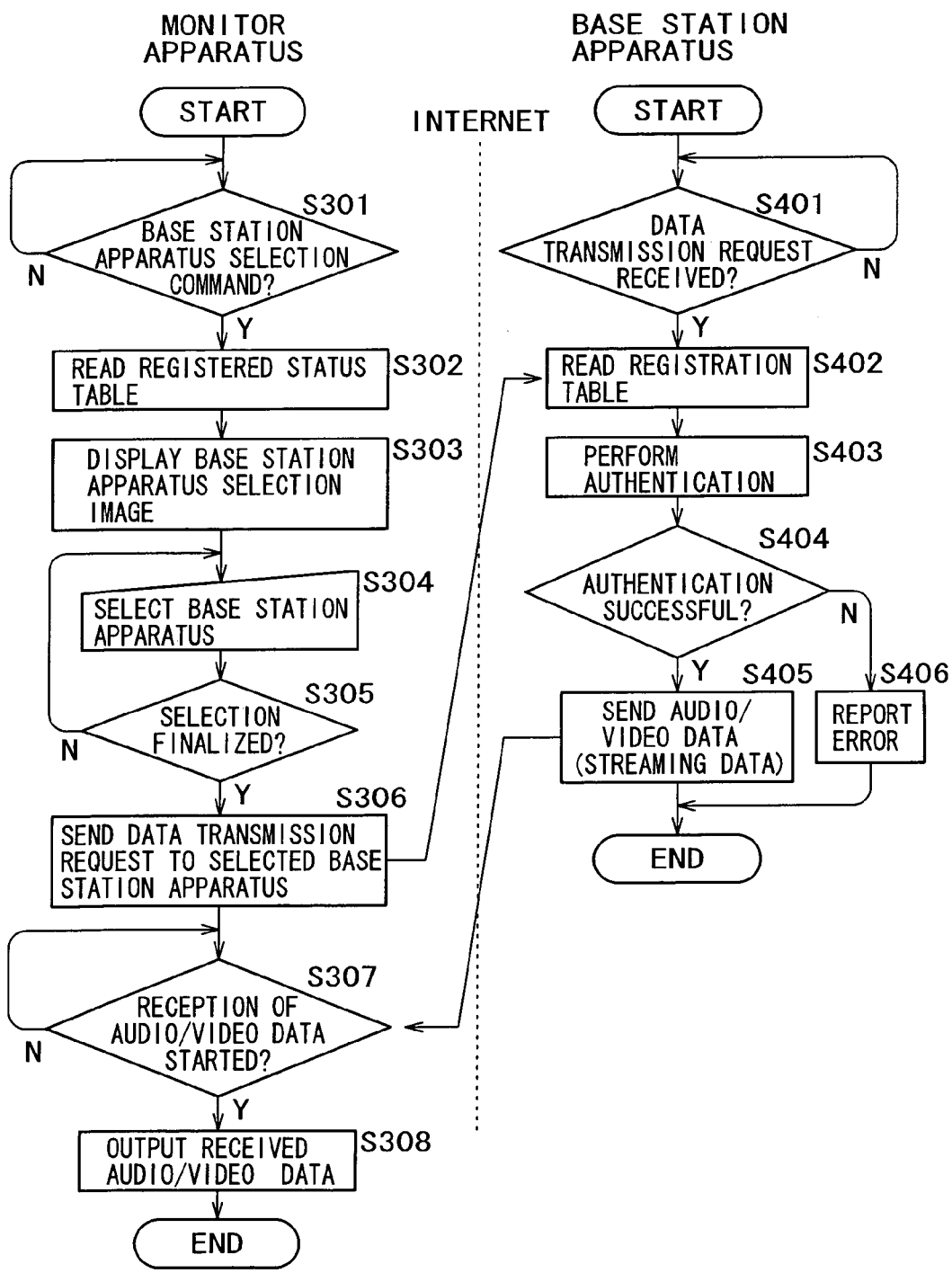
FIG. 7 is a flowchart of steps in which audio/video data is transmitted and received between the monitor apparatus and the base station apparatus.
Figure 8:
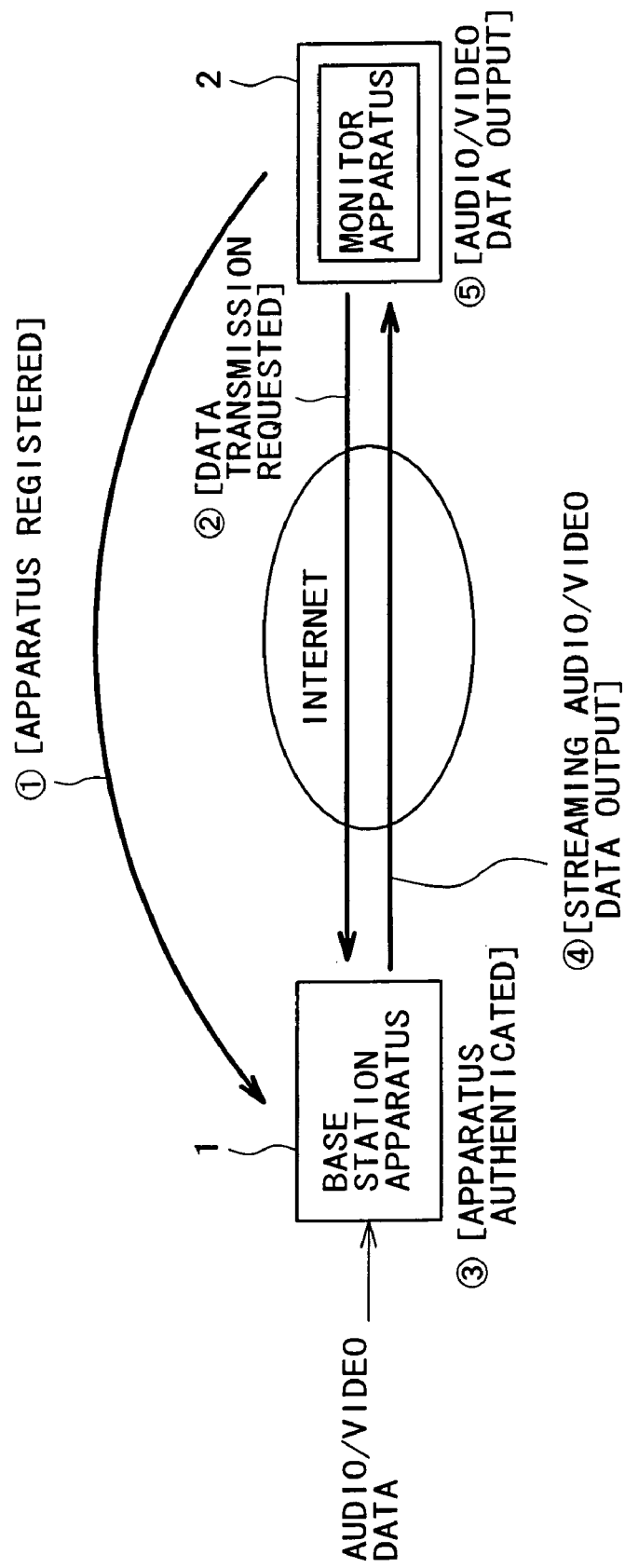
FIG. 8 is an explanatory view outlining a conventional information transmitting/receiving system.

Described below with reference to the flowchart of FIG. 7 are detailed steps performed by the monitor apparatus 2 and base station apparatus 1 in accomplishing steps 2 through 5 discussed above with reference to FIG. 2. In steps 2 through 5 of FIG. 2, according to the foregoing description, the monitor apparatus 2 selects one of a plurality of base station apparatuses 1 with which it has registered and receives content information such as audio/video data from the selected base station apparatus 1.

Referring to FIG. 7, the control unit 15 of the base station apparatus 1 carries out its processing illustratively in accordance with programs held in an internal ROM; the control unit 22 of the monitor apparatus 2 executes its processing in keeping with programs placed in an internal ROM. Whereas apparatus registration had to be accomplished by local communications between the base station apparatus 1 and the monitor apparatus 2 as discussed earlier, the steps shown in FIG. 7 are carried out by Internet (network) communications between the two connected apparatuses.

For purpose of simplification and illustration, the content information to be sent from the base station apparatus 1 to the monitor apparatus 2 is either audio/video data from TV broadcasts or audio/video data input through the audio/video input unit 13. That is, the content information is transmitted to the monitor apparatus 2 on a streaming basis.

In step S301, the monitor apparatus 2 waits for the entry of a command for designating the selection of a base station apparatus. Illustratively, the user operates on the operation input unit 30 to start selecting the base station apparatus from which to receive audio/video data. The user's operation causes a base station apparatus selection command to be issued, and step S302 is reached.

Steps S302 through S305 in FIG. 7 correspond to step 2 in FIG. 2. In step S302, the control unit 22 accesses the memory unit 23 to read the registered status table held therein. The registered status table contains IDs identifying the base station apparatuses 1 with which this monitor apparatus 2 has registered. In step S303, the control unit 22 controls illustratively the display control unit 26 based on the content of the registered status table so as to generate GUI image data. The generated data provides a GUI image which is displayed on the display unit 27 and which gives a list of the base station apparatuses 1 to choose from, the apparatuses 1 being those with which this monitor apparatus 2 has registered.

In step S304, a suitable operation on the GUI image displayed in step S303 causes the designated base station apparatus 1 to be selected. A new base station apparatus 1 is selected every time the GUI image is suitably operated on. At this point, the base station apparatus 1 being selected is displayed in so-called "active" fashion or is displayed in ways emphasizing the selected apparatus for its better visual recognition. In step S305, a check is made to determine whether an operation is carried out to finalize the current selection. If such an operation is detected, the currently selected base station apparatus 1 is definitely selected for actual use. Step S305 is followed by step S306.

Step S306 corresponds to step 3 in FIG. 2. In step S306, a control process is carried out to send over the Internet a command which designates the audio/video data making up content information and which requests the base station apparatus 1 selected in steps S304 and S305 to transmit the designated audio/video data to the monitor apparatus 2 (the command is called the audio/video data transmission request command).

In this case, the control unit 22 issues the audio/video data transmission request command also in the predetermined command exchange format for network communications. The command is first forwarded to the network interface 25. From the network interface 25, the command is sent over the Internet to its destination, i.e., the selected base station apparatus 1.

Meanwhile, the base station apparatus 1 waits in step S401 for an audio/video data transmission request command to arrive. When the audio/video data transmission request command sent earlier in step S306 is received, the command is recognized as the affirmative result of the check in step S401, and step S402 is reached accordingly.

Steps S402 through S404 correspond to the apparatus authentication process in step 4 of FIG. 2. In step S402, the registration table held in the memory 16 is read for apparatus authentication. The registration table is used as the basis for carrying out the authentication process in step S403. Specifically, a check is made to determine whether the communicating monitor apparatus 2 having sent the audio/video data transmission request command is found in the registration table.

With this embodiment, the monitor apparatus 2 uses its MAC address as the monitor apparatus ID. The MAC address placed in a packet containing the audio/video data transmission request command identifies the terminal sending the packet. In practice, a MAC address is first obtained from the received packet of the audio/video data transmission request command, and a check is made to see if the same MAC address is stored in the registration table as a monitor apparatus ID.

In step S404, a check is made to determine whether or not the authentication process was successfully accomplished in step S403. If the authentication process turned out to be unsuccessful in step S403, i.e., if the monitor apparatus 2 was not found in the registration table, then step S406 is reached. In step S406, an error is illustratively reported to the communicating monitor apparatus 2 in response to the audio/video data transmission request command it has transmitted. Specific steps in which the monitor apparatus 2 deals with the error response, not shown in FIG. 7, may involve repeating a predetermined number of retries and/or outputting an error message.

If in step S404 the communicating monitor apparatus 2 is found registered in the registration table, then the monitor apparatus 2 is successfully authenticated. In this case, step S405 is reached.

In step S405, a control process is carried out to transmit over the Internet the audio/video data designated by the received audio/video data transmission request command. Illustratively, the audio/video data designated by the audio/video data transmission request command is first forwarded to the audio/video encoder 12. At this point, if the designated audio/video data comes from the TV broadcast on a particular channel, the TV tuner 11 is made first to receive the designated channel and then to transfer the audio/video data from the channel to the audio/video encoder 12. If the designated audio/video data comes from the AV equipment connected to the base station apparatus 1, then the audio/video input unit 13 selectively admits the audio/video data from the attached AV equipment and outputs the data to the audio/video encoder 12. In turn, the audio/video encoder 12 compression-encodes the audio/video data. The encoded data is transmitted from the network interface 25 to the monitor apparatus 2 over the Internet illustratively on a streaming basis.

In FIG. 7, the monitor apparatus 2 in step S307 waits for audio/video data to start arriving in response to the audio/video data transmission request command sent earlier in step S306. Illustratively, when the process of step S405 starts getting executed, the network interface 25 of the monitor apparatus 2 starts receiving the audio/video data being sent. The reception of the data, when detected, brings about the affirmative result of the check in step S307, and step S308 is reached accordingly.

In step S308, a control process is carried out to output as images and sounds the audio/video data whose reception is now underway. The workings of the monitor apparatus 2 during the audio/video output were discussed earlier with reference to FIG. 3.

The steps in FIG. 2 and those in FIG. 7 have been explained above with regard to examples in which streaming audio/video data is transmitted and received. However, this is not limitative of the invention. In addition to streaming audio/video data, the information transmitting/receiving system embodying this invention can handle as content information sound-free video signal data, image-free audio signal data, still image data, content data created by use of markup language such as HTML, and application files created and processed by various kinds of application software such as a mailer. These types of content information can be transmitted and received between the base station apparatus 1 and the monitor apparatus 2 in keeping with the steps shown in FIGS. 2 and 7.

Whereas this invention was shown to apply to a transmitting/receiving system constituted by base station apparatuses and a monitor apparatus, this is not limitative of the invention. The invention may also apply to transmitting/receiving systems of many other forms.

As many apparently different embodiments of this invention may be made without departing from the spirit and scope thereof, it is to be understood that the invention is not limited to the specific embodiments thereof except as defined in the appended claims.

What is claimed is:

1. An information transmitting/receiving system comprising:
    an information transmitting apparatus, which includes
        a first communicating section configured to effect communications over a predetermined network,
        an information acquiring section configured to acquire content information,
        a registration information managing section configured to create and hold registration information denoting the information receiving apparatus as being registered for authorization to receive said content information from said information transmitting apparatus,
        an authenticating section which, if said information transmitting apparatus is requested to transmit said content information using said first communicating section, checks said registration information to determine whether the information receiving apparatus that requests the content information transmission is authorized to receive said content information from said information transmitting apparatus, and
        a transmission controlling section which, if the information receiving apparatus that requests the content information transmission is authorized by said authentication section, causes said first communicating section to transmit said content information acquired by said information acquiring section to the information receiving apparatus that requests the content information transmission; and the information receiving apparatus, which includes
        a second communicating section configured to effect communications over said predetermined network,
        an information inputting section configured to input content information transmitted over said network using said second communicating section,
        a registered information managing section configured to create and hold registered information representing a plurality of information transmitting apparatus units with which said information receiving apparatus has registered for authorization to receive said content information as denoted in said registration information, and
        a communication control section configured to control said second communicating section to request any one of said plurality of information transmitting apparatus units indicated by said registered information to transmit said content information.

2. The information transmitting/receiving system according to claim 1, further comprising:
    a third communicating section which is included in said information transmitting apparatus and which effects communications over another communication network offering a smaller service area than said predetermined network;
    a fourth communicating section which is included in said information receiving apparatus and which effects communications over said another communication network; and
    a first registration performing section included in said information transmitting apparatus; and a second registration performing section included in said information receiving apparatus, said first registration performing section and said second registration performing section using said third communicating section and said fourth communicating section respectively to perform a registration process for authorizing a transmission of said content information from said information transmitting apparatus to said information receiving apparatus, wherein said registration information managing section creates said registration information in accordance with a result of said registration process performed by said first registration performing section and said second registration performing section, and said registered information managing section creates said registered information in accordance with a result of said registration process performed by said first registration performing section and said second registration performing section.

3. The information transmitting/receiving system according to claim 1, wherein said registration information includes a MAC address.

4. The information transmitting/receiving system according to claim 1, wherein at least a portion of said predetermined network includes the Internet.

5. The information transmitting/receiving system according to claim 1, wherein said content information includes a television signal, and said information transmitting apparatus and said information receiving apparatus are located in different countries.

6. An information transmitting/receiving system comprising:

an information transmitting apparatus, which includes
a first means for communicating data over a predetermined network,
means for acquiring content information,
means for creating and holding registration information denoting the information receiving apparatus as being registered for authorization to receive said content information from said information transmitting apparatus,
an authenticating means for, if said information transmitting apparatus is requested to transmit said content information using said first means for communicating, checking said registration information to determine whether the information receiving apparatus that requests the content information transmission is authorized to receive said content information from said information transmitting apparatus, and
means for controlling which, if the information receiving apparatus that requests the content information transmission is authorized by said authenticating means, causes said first means for communicating data to transmit said content information acquired by said means for acquiring content information to the information receiving apparatus that requests the content information transmission; and
the information receiving apparatus, which includes
a second means for communicating data over said predetermined network,
means for inputting content information transmitted over said network using said second means for communicating data,
means for creating and holding registered information representing a plurality of information transmitting apparatus units with which said information receiving apparatus has registered for authorization to receive said content information as denoted in said registration information, and
means for controlling said second means for communicating data to request any one of said plurality of information transmitting apparatus units indicated by said registered information to transmit said content information.

7. An information transmitting apparatus comprising:
a communication section configured to effect communications over a predetermined network;
an information acquiring section configured to acquire content information;
a registration information managing section configured to create and hold registration information denoting an information receiving apparatus registered for authorization to receive said content information from said information transmitting apparatus;
an authenticating section which, if said information transmitting apparatus is requested to transmit said content information using said communicating section, references for authentication of said registration information in order to determine whether the information receiving apparatus requesting the content information transmission is authorized to receive said content information from said information transmitting apparatus; and
a transmission controlling section which, if the requesting information receiving apparatus is found authorized to receive said content information as a result of the authentication by said authenticating section, causes said communicating section to transmit said content information acquired by said information acquiring section to the information receiving apparatus requesting the content information transmission.

8. The information transmitting apparatus of claim 7, wherein said registration information includes a MAC address.

9. The information transmitting apparatus of claim 7, wherein at least a portion of said predetermined network includes the Internet.

10. The information transmitting apparatus of claim 7, wherein said content information includes a television signal, and said information transmitting apparatus and said information receiving apparatus are located in different countries.

11. An information receiving apparatus comprising:
a communication section configured to effect communications over a predetermined network;
an information inputting section configured to input content information transmitted over said network using said communicating section;
a registered information managing section configured to create and hold registered information representing a plurality of units of an information transmitting apparatus with which said information receiving apparatus has registered for authorization to receive said content information; and
a communication controlling section configured to cause said communicating section to effect a communication requesting any one of said units of said information transmitting apparatus denoted by said registered information to transmit said content information.

12. The information receiving apparatus of claim 11, wherein said registration information includes a MAC address.

13. The information receiving apparatus of claim 11, wherein at least a portion of said predetermined network includes the Internet.

14. The information receiving apparatus of claim 11, wherein said content information includes a television signal, and said information transmitting apparatus and said information receiving apparatus are located in different countries.

15. An information transmitting/receiving method for use with an information transmitting apparatus and an information receiving apparatus, said information transmitting/receiving method comprising the steps of:
　causing said information transmitting apparatus to carry out
　　effecting communications over a predetermined network;
　　acquiring content information;
　　creating and holding registration information denoting the information receiving apparatus registered for authorization to receive said content information from said information transmitting apparatus;
　　if said information transmitting apparatus is requested to transmit said content information in said effecting communications step, referring to said registration information for authentication and determining whether the information receiving apparatus requesting the content information transmission is authorized to receive said content information from said information transmitting apparatus; and
　　if in the determining step the information receiving apparatus is found to be authorized to receive said content information as a result of the authentication in said authenticating process, transmitting said content information acquired in said acquiring step to the information receiving apparatus requesting the content information transmission; and
　causing said information receiving apparatus to carry out
　　effecting communications over said predetermined network;
　　inputting content information transmitted over said network;
　　creating and holding registered information representing a plurality of information transmitting apparatus units with which said information receiving apparatus has registered for authorization to receive said content information as denoted in said registration information; and
　　effecting a communication requesting any one of said units of said information transmitting apparatus indicated by said registered information to transmit said content information.

16. The method of claim 15, wherein said registration information includes a MAC address.

17. The method of claim 15, wherein at least a portion of said predetermined network includes the Internet.

18. The method of claim 15, wherein said content information includes a television signal, and said information transmitting apparatus and said information receiving apparatus are located in different countries.

19. A computer program product containing computer readable instructions that implement a process for use with an information transmitting apparatus and an information receiving apparatus when said instructions are executed by a processor, steps of said process including:
　causing said information transmitting apparatus to carry out
　　effecting communications over a predetermined network;
　　acquiring content information;
　　creating and holding registration information denoting the information receiving apparatus registered for authorization to receive said content information from said information transmitting apparatus;
　　if said information transmitting apparatus is requested to transmit said content information in said effecting communications step, referring to said registration information for authentication and determining whether the information receiving apparatus requesting the content information transmission is authorized to receive said content information from said information transmitting apparatus; and
　　if in the determining step the information receiving apparatus is found to be authorized to receive said content information as a result of the authentication in said authenticating process, transmitting said content information acquired in said acquiring step to the information receiving apparatus requesting the content information transmission; and
　causing said information receiving apparatus to carry out
　　effecting communications over said predetermined network;
　　inputting content information transmitted over said network;
　　creating and holding registered information representing a plurality of information transmitting apparatus units with which said information receiving apparatus has registered for authorization to receive said content information as denoted in said registration information; and
　　effecting a communication requesting any one of said units of said information transmitting apparatus indicated by said registered information to transmit said content information.

20. An information transmitting/receiving method for use with an information transmitting apparatus and an information receiving apparatus, said information transmitting/receiving method comprising steps for:
　causing said information transmitting apparatus to carry out
　　effecting communications over a predetermined network;
　　acquiring content information;
　　creating and holding registration information denoting the information receiving apparatus registered for authorization to receive said content information from said information transmitting apparatus;
　　if said information transmitting apparatus is requested to transmit said content information in said effecting communications step, referring to said registration information for authentication and determining whether the information receiving apparatus requesting the content information transmission is authorized to receive said content information from said information transmitting apparatus; and
　　if in the determining step the information receiving apparatus is found to be authorized to receive said content information as a result of the authentication in said authenticating process, transmitting said content information acquired in said acquiring step to the information receiving apparatus requesting the content information transmission; and
　causing said information receiving apparatus to carry out
　　effecting communications over said predetermined network;
　　inputting content information transmitted over said network;

creating and holding registered information representing a plurality of information transmitting apparatus units with which said information receiving apparatus has registered for authorization to receive said content information as denoted in said registration information; and effecting a communication requesting any one of said units of said information transmitting apparatus indicated by said registered information to transmit said content information.

* * * * *